May 23, 1967 E. G. WEBER 3,321,390

MICROCIRCUITS FORMED BY RADIO-FREQUENCY BRUSH DISCHARGES

Filed Oct. 17, 1963

INVENTOR
ERWIN G. WEBER

BY Irvin M. Haugen
ATTORNEY

United States Patent Office 3,321,390
Patented May 23, 1967

3,321,390
MICROCIRCUITS FORMED BY RADIO-FREQUENCY BRUSH DISCHARGES

Erwin G. Weber, Bad Homburg vor der Hohe, Germany, assignor to Sperry Rand Corporation, New York, N.Y., a corporation of Delaware Filed Oct. 17, 1963, Ser. No. 316,984
6 Claims. (Cl. 204—164)

The present invention relates generally to an apparatus and technique for preparing metallic layers along portions of an insulating medium, such as a printed circuit member or the like, and more specifically to an extremely high speed device of this type which utilizes an electrical discharge phenomena for forming an image, trace, or circuit pattern on a record member. The electrical discharge phenomena employs a specific form of pulse which is particularly adapted to establish a brush type electrical discharge between a pair of spaced electrodes, one electrode being a template or pattern electrode, the other being a base electrode, the gap area between the electrodes being occupied by a reducible metal powder arranged or disposed on the surface of an insulating body or substrate.

At the present time, printed circuits are utilized for many electrical and electronic applications. Any technique which enhances the preparation of these circuit elements, particularly with regard to fine-line definition, or permits closer spacing provides a substantial advantage in the art. For example, data processing systems utilizing thin film magnetic memories may be miniaturized and rendered more compact by the utilization of printed circuits having fine-line definition, and close inter-electrode spacing. While many techniques are known today for preparing printed circuits, most of these techniques, including the well known etching techniques and the like, are not well adapted to preparing circuit patterns having extremely fine-line definition.

Various electrical discharge techniques have been employed for treating solid reducible metallic compounds in the past. For example, an electrical arc may have been utilized to perform work on a reducible metallic compound. The present technique employs a brush type discharge which dissipates a quantity of energy at a rate which is particularly suited to treatment of reducible metallic compounds. There is accordingly no danger of encountering local hot spots or the like throughout the pattern, thus the substrate is essentially preserved. A corona discharge is unsuited inasmuch as insufficient power is available to suitably treat the reducible metallic compound. The brush discharge state is a transitional type discharge which exists at an interval of time between the corona discharge state and the arc discharge state.

The brush discharge comprises a plurality of closely spaced individual spark channels which transcend the electrode gap under the influence of a high potential existing thereacross, and it is this transcending discharge zone which is responsible for the dissipation of an optimum amount of energy across the gap to perform the treatment or reduction operation on the reducible metallic compound disposed therein. The existence of a spark as a transitory, discontinuous electrical equilibration process across an electrode gap will depend not only upon the medium carrying the spark, that is, the gas which exists in the gap, but also on the circuitry which supplies the energy to the gap electrode. Inasmuch as the gas available in the gap is normally atmospheric air, the circuitry supplying the energy to the gap will become more pertinent. Accordingly, it has been found that at a preferred frequency range of from 4 mc. to about 10.5 mc., the application of energy to the gap is essential for only about 50–60 micro-seconds, particularly when the voltage applied is just slightly in excess of the breakdown potential across the gap. This arrangement has been found proper for establishing a brush type of transmittal electrode discharge.

The energy dissipated in the discharge process is manifested in the surrounding gas as a shock wave with a bright luminous phenomena and also with sound energy in the form of audible cracks, hisses, etc. The greater the quantity of heat available in the spark gap, the higher the light emission of the channel and the faster the channel travels across the gap by pre-ionization of its path through its own emitted ultra-violet photons and resulting photoelectrons. The time necessary for the preparation of channels for a break-down across the gap is defined as the formative time lag, this being the total time necessary to develop or initiate a spark. The formative time lag reduces sharply with an increase in the gap over-voltage; the over-voltage being the excess over that certain minimum voltage which is required to establish a spark across the gap. The existence of space charges and high-frequency potentials each have a profound influence upon the formation and types of sparks available. In very high frequencies, certain sluggish ions become immovable and the electrons travel many more times across the gap. In this situation, the ionization probability is increased. It has been found, however, that spark charges are not active in the early stages in the build-up of the spark, and the formative time lag is due largely to the time required for currents to grow to space-charged-producing magnitudes. At each sparking event, there is also a statistical time lag, however, this statistical time lag is insignificant when frequencies and voltages are very high and when preionizing devices such as radio-active elements or the like are employed.

It has been determined that radio frequencies such as in the range from between about 4 mc. and 10.5 mc. are ideal for producing the high energy discharge which is particularly suited for reducing reasonably thick layers of solid reducible metal compounds. At these frequencies it has been learned that the discharge is predominantly electronic in nature; however, sufficient heat is dissipated in order to make the reducing operation fast, effective and extremely local in application. The fast rise time experienced at these frequencies appears to cause the simultaneous breakdown of a plurality of channels across the gap. The polarity reversal in these frequencies is believed to be sufficiently rapid to sweep out space charges, and the discharges may be interrupted at substantially the point in time when the discharge is in the spark-to-arc transition stage. In other words, this discharge is interrupted prior to the time at which the electrodes become heated and thereby become subject to sublimation and also subject to the commencing of a slowly extinguishable inertia-laden arc. However, the energy which is dissipated is sufficient to provide a powerful energy or shock wave across the gap by which the reducing operation may be accomplished. In addition to the straight RF energy which may be utilized across the gap, it is also contemplated that a direct current pulse may be superimposed upon the RF pulse in order to enhance the reduction operation. If a direct current pulse is employed in combination with the RF pulse, the frequency range may be extended and particularly so at the higher direction.

The particular reducible metallic compound which may be employed in order to accomplish the technique of the present invention may preferably be selected from the class consisting of silver or copper, carbonyls, nitrils, halides or the like. The thickness of the reducible metallic film depends to a degree upon the available RF power, and the greater the quantity of power available, the greater the thickness of the metal which is possible to form, fabricate or otherwise prepare. While the reducible metal powder is previously arranged, discharged or otherwise situated on an insulating film base, or substrate, this film base or substrate is in turn supported by a base electrode. Polymerized resins such as methyl methacrylate or the like may be suitably employed. A conductive template is utilized to act as one of the two electrodes for establishing the discharge pattern therebetween, each of the electrodes being of course connected to a suitable source of RF energy. In this arrangement the RF discharge between the two electrodes will have the effect separating the metallic ion from the remaining anion of the compound or composition and thus form a film of the metal along a predetermined path or pattern. Inasmuch as the RF brush discharge tends to contract or pinch along the gap between the electrodes the line definition will be precise, and the width may be as narrow as is conveniently possible. Extra line spacing may also be held at a suitable minimum.

Therefore, it is an object of the present invention to prepare printed circuits particularly along the surface of a suitable substrate or the like by means of a brush transitional discharge.

It is a further object of the present invention to provide an improved technique for preparing printed circuitry or the like having extremely fine line definition as possible.

It is yet another object of the present invention to prepare a printed circuit pattern from a solid reducible metal compound which is arranged along or upon the surface of a substrate member or film, the compound being reducible directly by the reaction of an RF transition arc discharge phenomena. Further objects of the present invention will become apparent to those skilled in the art upon a study of the following specification, appended claims and accompanying drawings wherein:

Figure 1:
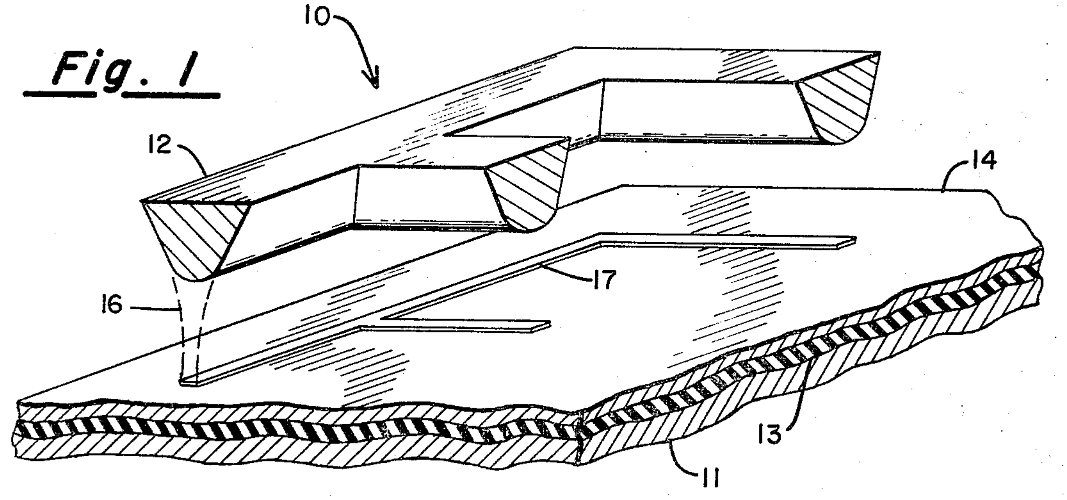
FIGURE 1 is a perspective view, partially in section and partially broken away showing a template electrode arranged in suitable and uniformly spaced relationship to a second electrode so as to form a gap, the area between the gap being occupied in part by an insulating substrate together with a layer of a reducible metallic compound thereon.

In accordance with the preferred modification of the present invention the arrangement generally designated 10 in FIGURE 1 includes a base electrode 11 together with a suitable template or pattern electrode 12. In the gap area therebetween, substrate layer 13 is shown along with a covering layer of a suitable solid reducible metallic compound, such as, for example, a silver halide. The pinched pattern of the brush electrical discharge is shown at 16 and the pattern formed along the extent of the reducible metallic compound is shown at 17. Any reasonable conductive material may be utilized for the template electrode 12 and for the base electrode 11. However, highly durable materials are obviously preferred, these durable metals being free from a tendency to sublime or otherwise decompose. Tungsten, or molybdenum, or the like may be suitably employed. The gap distance between the electrodes is preferably uniformly spaced and of the order of 4 mils to 10 mils and preferably about 8 mils. For this distance a field potential of between about 1500 volts and 2000 volts peak-to-peak for a gap distance of about 8 mils is preferred. The frequency of the discharge is preferably between about 4 mc. and 10.5 mc. and ranges in duration of between about 50 micro-seconds and 60 micro-seconds. When reducible silver compounds are employed the light energy which is formed in the arc discharge may enhance the reduction of the silver to free metal. The silver metal formed in this manner will be expected to be of a highly refined quality and have a relatively dense configuration.

Figure 2:
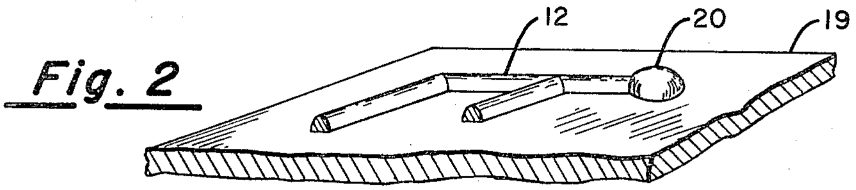
FIGURE 2 is a detailed perspective view of a template electrode prepared for use in connection with the present invention.

Particular attention is now directed to FIGURE 2 of the drawings wherein there is shown in substantial detail a pattern or template electrode prepared for use in connection with the present invention, the electrode being designated 12, the support therefor being designated 19. For many purposes, applications, uses and the like it is preferred that the template electrode be mounted on a suitable backing surface in order to provide mechanical rigidity. Contact to the electrode 12 may be established at 20 if desired, the enlarged area at 20 being utilized to provide additional contact area on the finished product or pattern.

Figure 3:
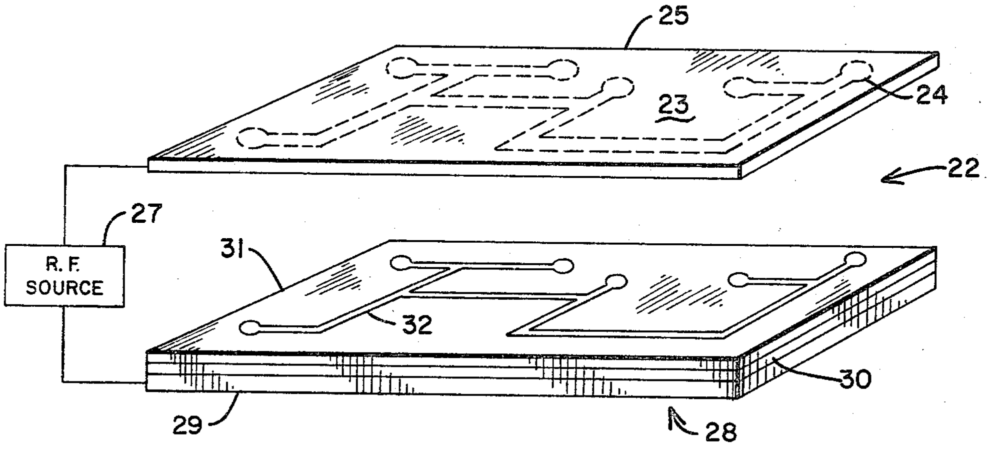
FIGURE 3 is a perspective view of a suitable arrangement which is adapted for practicing the present invention and showing a pair of spaced electrodes together with a circuitry pattern formed therebetween.

Turning now to FIGURE 3, the apparatus generally designated 22 includes a template pattern electrode assembly 23 which comprises a conductive pattern area 24 along with a suitable insulating support 25. The energy is supplied from the RF source, particularly as shown at 26. The counter electrode or power electrode designated 28, includes a suitable conductor or backing 29, a substrate 30 and a film layer of a reducible metallic compound, as at 31. The pattern shown at 32 is that which is obtained from the passage of a transitional discharge between the pattern 24 and the backing electrode 29, the area 32 being a replica of the configuration of the template 24. Upon completion of the discharge event, the remaining metallic compound is brushed or otherwise removed from the surface of the substrate 30, leaving only the desired circuit pattern thereon. It is generally desirable that the reducible metallic compound be relatively finely divided or powdered in order that the line definition may be in accordance with the desired circuitry pattern. Obviously, large particles of the reducible metallic compound will interfere with the preparation of conductive patterns having a uniform, fine or smooth edge definition.

The specific arrangement of the RF source is disclosed in detail in my co-pending application Ser. No. 316,979 in which John A. Engstrom is a co-inventor, the application being entitled Signal Responsive Apparatus, executed on even date herewith and assigned to the same assignee as the present invention. The energy available in the apparatus desclosed in my above referenced co-pending application is suitable for use in connection with the present apparatus.

It will be appreciated, of course, that suitable feed mechanisms, charging mechanisms or the like may be employed to rapidly produce power for use in accordance with the technique of the present invention. Inasmuch as the preparation time involved is far less than one second, enhanced charging techniques will contribute to the speed at which the assembly system may be utilized.

For most operations, particularly when a salt such as silver bromide is utilized, a powdered layer of about 2 to 3 mils is preferred. It will be appreciated that other powder-layer thicknesses may be employed which will be compatible with the quantity of energy available and the over-all thickness of the finished conductive bar or film.

As a modification of the technique set forth herein above, it is possible to modify the apparatus to form plated through holes which will enable connections to be made between oppositely disposed major surfaces of a substrate member. In this technique the circuitry film template is removed and a template having one or a plurality of conductive spots is substituted therefor. A reducible metal powder layer is applied over the spot and the energy is increased to a point that will cause a decomposition of the substrate to occur, the residual energy being such to prepare a conductive lining on the walls of the hole formed in the substrate.

It will be appreciated that the specific examples given herein are for purposes of illustration only and are not to be otherwise construed as a limitation upon the scope of the present invention. Obviously, those skilled in the art may depart from these specific examples without actually departing from the spirit and scope of the present invention.

What is claimed is:

1. The method of preparing a metallic layer on the surface of an insulating film which method comprises the steps of placing a continuous layer of a solid compound selected from the group consisting of reducible silver compounds and reducible copper compounds on the surface of an insulating film to form a working blank, placing the working blank between a pattern electrode and a base electrode, the pattern electrode being disposed adjacent to and uniformly spaced from the reducible metal compound and thence passing an RF discharge consisting essentially of a brush discharge between said electrodes.

2. The method of preparing a metallic layer on the surface of an insulating film which method comprises the steps of placing a continuous layer of a solid compound selected from the group consisting of reducible silver compounds and reducible copper compounds on the surface of an insulating film to form a working blank, placing the working blank between a pattern electrode and a base electrode, the pattern electrode being disposed adjacent to and uniformly spaced from the reducible metal compound and thence passing an RF discharge consisting essentially of a brush discharge between said electrodes, the potential across the gap being only slightly greater than the breakdown potential for said gap.

3. The method of preparing a metallic layer on the surface of an insulating film comprising the steps of placing a continuous layer of a solid reducible metallic compound selected from the class consisting of copper and silver, carbonyls, nitrils and halides on the surface of an insulating film to form a working blank, placing the working blank between a pattern electrode and a base electrode, the pattern electrode being disposed adjacent to and uniformly spaced from the reducible metal compound and thence passing an RF discharge consisting essentially of a brush discharge between said electrodes.

4. The method as set forth in claim 1, being particularly characterized in that said RF discharge has a frequency ranging from about 4.5 mc. up to 10.5 mc.

5. Method as set forth in claim 1, being particularly characterized in that the RF discharge is conducted until predetermined areas of said solid reducible metal compounds are reduced to the free metal.

6. The method of preparing a metallic layer on the surface of an insulating film which method comprises the steps of placing a continuous layer of a solid compound selected from the group consisting of reducible silver compounds and reducible copper compounds on the surface of an insulating film to form a working blank, placing the working blank between a pattern electrode and a base electrode, the pattern electrode being disposed adjacent to and uniformly spaced from the reducible metal compound and thence passing an RF discharge consisting essentially of a brush discharge between said electrodes, the energy being sufficient to decompose and remove a portion of the insulating film which is disposed between said pattern electrode and said base electrode, the reducible metallic compound forming a metallic layer on the insulating film along and adjacent to the decomposed portion.

References Cited by the Examiner

UNITED STATES PATENTS

| | | | |
|---|---|---|---|
| 2,698,812 | 1/1955 | Schladitz | 117—93.1 |
| 3,114,652 | 12/1963 | Schetky | 117—93.1 |
| 3,243,363 | 3/1966 | Helwig | 204—164 |
| 3,245,895 | 4/1966 | Baker | 204—164 |

JOHN H. MACK, *Primary Examiner.*

HOWARD S. WILLIAMS, *Examiner.*

R. K. MIHALEK, *Assistant Examiner.*